United States Patent
Kroos et al.

(10) Patent No.: US 11,247,284 B2
(45) Date of Patent: Feb. 15, 2022

(54) METHOD FOR PRODUCING A HOLLOW VALVE

(71) Applicant: Mahle International GmbH, Stuttgart (DE)

(72) Inventors: Peter Kroos, Rutesheim (DE); Christoph Luven, Stuttgart (DE)

(73) Assignee: Mahle International GmbH

(\*) Notice: Subject to any disclaimer, the term of this patent is extended or adjusted under 35 U.S.C. 154(b) by 129 days.

(21) Appl. No.: 15/534,965

(22) PCT Filed: Dec. 7, 2015

(86) PCT No.: PCT/EP2015/078831
§ 371 (c)(1),
(2) Date: Jun. 9, 2017

(87) PCT Pub. No.: WO2016/091808
PCT Pub. Date: Jun. 16, 2016

(65) Prior Publication Data
US 2017/0348782 A1     Dec. 7, 2017

(30) Foreign Application Priority Data

Dec. 11, 2014  (DE) .......................... 102014225618.6

(51) Int. Cl.
*B23H 3/00* (2006.01)
*F01L 3/14* (2006.01)
(Continued)

(52) U.S. Cl.
CPC ................. *B23H 9/14* (2013.01); *B23H 3/00* (2013.01); *B23P 15/002* (2013.01); *F01L 3/14* (2013.01);
(Continued)

(58) Field of Classification Search
CPC ......... B23P 15/001; B23P 15/002; F01L 3/14; F01L 3/16; F16K 2099/0072;
(Continued)

(56) References Cited

U.S. PATENT DOCUMENTS 2,577,644 A    12/1951 Bartlett
4,250,011 A    2/1981 Capello et al.
(Continued)

FOREIGN PATENT DOCUMENTS

DE    2209068 A1    10/1973
DE    2943418 A1    5/1980
(Continued)

OTHER PUBLICATIONS

Machine Translation of JP 2013-180389 A (Year: 2013).*
(Continued)

*Primary Examiner* — Christopher J Besler
(74) *Attorney, Agent, or Firm* — Fishman Stewart PLLC

(57) ABSTRACT

A method for producing at least one hollow valve for gas exchange may include introducing a bore into a valve shaft and into a valve head to form the at least one hollow valve, measuring a depth of the bore, washing the at least one hollow valve at least once, providing the at least one hollow valve in a retaining device, orienting the retaining device together with the at least one hollow valve with respect to an associated electrode, moving the associated electrode in relation to the at least one hollow valve, inserting the associated electrode into the bore of the at least one hollow valve, enlarging the bore in a region of the valve head by electromechanical machining processes, removing the associated electrode from the at least one hollow valve, rinsing and/or preserving the at least one hollow valve, and measuring a wall thickness of a valve bottom.

18 Claims, 1 Drawing Sheet

(51) Int. Cl.

| | |
|---|---|
| *B23P 15/00* | (2006.01) |
| *B23H 9/14* | (2006.01) |
| *G01B 21/08* | (2006.01) |
| *F16K 43/00* | (2006.01) |
| *G01B 21/18* | (2006.01) |
| *F01L 3/20* | (2006.01) |

(52) U.S. Cl.
CPC .............. *F16K 43/00* (2013.01); *G01B 21/08* (2013.01); *G01B 21/18* (2013.01); *F01L 3/20* (2013.01); *F01L 2303/01* (2020.05)

(58) Field of Classification Search
CPC ..... F16K 2099/0076; G01B 9/02; G01B 5/12; B23H 3/04; B23H 7/08; B23H 1/04; B23H 5/10; B23H 7/22

See application file for complete search history.

(56) References Cited

U.S. PATENT DOCUMENTS

| | | | | |
|---|---|---|---|---|
| 5,126,530 | A * | 6/1992 | Burgmer ................. | B23K 5/18 219/121.64 |
| 5,146,061 | A * | 9/1992 | Huebler ................. | B23H 1/04 219/69.15 |
| 9,751,164 | B2 * | 9/2017 | Ishii ......................... | B21K 1/22 |
| 9,790,822 | B2 * | 10/2017 | Tsuneishi ................. | F01L 3/02 |
| 2002/0171846 | A1 | 11/2002 | Drake | |
| 2009/0144999 | A1 * | 6/2009 | Lau ......................... | G01B 5/12 33/544.1 |
| 2012/0246936 | A1 * | 10/2012 | Morii ..................... | B23P 15/002 29/890.132 |
| 2012/0255175 | A1 * | 10/2012 | Morii ..................... | B21C 23/183 29/888.45 |
| 2015/0240675 | A1 * | 8/2015 | Homma .................... | F01L 3/16 251/366 |
| 2016/0349047 | A1 | 12/2016 | Kroos et al. | |

FOREIGN PATENT DOCUMENTS

| | | | | |
|---|---|---|---|---|
| DE | 102010051871 | A1 | 5/2012 | |
| DE | 102013203443 | A1 | 8/2014 | |
| DE | 102014202021 | A1 | 8/2015 | |
| JP | 2002331426 | A | 11/2002 | |
| JP | 2013180389 | A * | 9/2013 | |
| WO | WO-2014054302 | A1 * | 4/2014 | ................ F01L 3/16 |

OTHER PUBLICATIONS

English abstract of DE-102010051871.
English abstract for JP-2002331426.
English abstract for DE-102013203443.
Chinese Office Action dated Feb. 26, 2021 for copending Chinese Appl. No. 201580066707.5.
Chinese NPL document listed as E1 in Chinese Office Action.
Chinese NPL document listed as E2 in Chinese Office Action.
Chinese NPL document listed as E3 in Chinese Office Action.

* cited by examiner

METHOD FOR PRODUCING A HOLLOW VALVE

CROSS-REFERENCE TO RELATED APPLICATIONS

This application claims priority to International Patent Application No. PCT/EP2015/078831, filed on Dec. 7, 2015, and German Patent Application No. DE 10 2014 225 618.6, filed on Dec. 11, 2014. the contents of both of which are incorporated by reference in their entireties.

TECHNICAL FIELD

The present invention relates to a method for producing at least one hollow valve for gas exchange, in particular for internal combustion engines.

BACKGROUND

From DE 10 2010 051 871 A1 a generic method is known for producing hollow valves for gas exchange, in particular for internal combustion engines, in which a valve head and a valve shaft are respectively constructed as a hollow part. Here, the cavities of the hollow parts forming a valve are connected to one another and are produced at least partly by electrochemical metal erosion in an electrolytic medium, wherein firstly the valve shaft is bored through lengthwise and subsequently the cavity in the valve head is produced as an extension bore transversely to the longitudinal axis of the valve shaft. Hereby, in particular, the production of such hollow valves is to be able to be simplified.

SUMMARY

The present invention is concerned with the problem of indicating for a method of the generic type an improved or at least alternative embodiment, which in particular meets a high quality requirement. This problem is solved according to the invention by the subject of the independent claims. Advantageous embodiments are the subject of the dependent claims.

The present invention is based on the general idea of establishing extremely precisely a method for producing at least one hollow valve for gas exchange with all partial steps, and thereby of improving the quality of the production. In the method according to the invention therefore firstly in a method step a.) a bore is introduced into a valve shaft and into a valve head of a hollow valve, or a hollow valve which has been pre-bored in such a manner is provided. The bore in the valve head and valve shaft runs here parallel to the shaft axis. In the method step b.) subsequent thereto, a depth t of the bore is measured and the at least one hollow valve is washed at least once and thereby cleaned. The washing can take place here before or after the measuring of the depth t of the bore. Subsequently, in method step c.) the at least one hollow valve is provided in a retaining device and by means of the latter in method step d.) is oriented with respect to an associated electrode, by means of which the electrochemical metal erosion takes place. For this, in method step e.) the electrode enters into the bore from the direction of the shaft end. The associated electrode does not move during the electrochemical metal erosion. By means of the electrode, in method step f.) the bore is enlarged in the region of the valve head by means of ECM processes and thereby a cavity is created in the hollow valve for receiving a coolant. Subsequently, the associated electrode is removed from the hollow valve in method step g.) and the latter is rinsed or respectively preserved in method step h.). Finally, in method step i.) a measurement of the remaining wall thickness of a valve bottom is now carried out, in order in particular to be able to safely receive the high forces acting on the valve bottom. Through the establishing of the individual method steps a) to i.), the production quality can be distinctly increased, because the process necessary for achieving the optimum production result is exactly defined in the individual process steps. With the method according to the invention, it is therefore possible to produce a hollow valve not only efficiently with regard to manufacturing, but in addition also with the highest quality.

In an advantageous further development of the solution according to the invention, a measurement of the depth t of the bore takes place in a tactile manner and/or by means of ultrasound. In particular the measurement by means of ultrasound represents here a non-contact and extremely exact measurement method, wherein of course alternatively also a laser could be used. Purely theoretically, tactile measuring by means of a corresponding measuring rod is of course also possible and able to be integrated into the process in a simple manner in terms of production.

In a further advantageous embodiment of the method according to the invention, a measurement of the remaining wall thickness of the valve bottom takes place in a tactile manner and/or by means of ultrasound. In order to be able to safely receive the high forces occurring in particular on the valve bottom during the operation of the internal combustion engine, a minimum wall thickness of the valve bottom is absolutely necessary, which is determined by the identifying of the remaining wall thickness by the ECM process. The determined remaining wall thickness must always lie above the required minimum wall thickness here, in order to be able to safely receive the stresses which occur.

Expediently, the retaining device together with the hollow valve is provided continuously, in particular by means of a conveyor belt or a robot. Hereby, a continuous production process is to be created, wherein of course also a provision by means of a robot enables a simultaneous provision of several hollow valves. Purely theoretically, these can also be received in a pallet-like retaining device, so that the robot can simultaneously provide such a pallet with a plurality of such hollow valves.

In an advantageous further development of the solution according to the invention, an orientation of the retaining device together with hollow valve in relation to the associated electrode takes place by means of a gripper which orientates the bore of the hollow valve in relation to an insertion chamfer of the electrode. Such an insertion chamfer of the electrode enables a concentric orientation of the electrode in relation to the bore and therefore an exact positioning for the ECM process. Through the exact centric orientation of the electrode within the bore, it can be guaranteed in the subsequent ECM process that an erosion in the valve head acts identically in all directions for the production of a cavity, and after completion of the ECM process also leaves behind correspondingly identical remaining wall thicknesses.

In a further advantageous embodiment of the solution according to the invention, the retaining device together with the hollow valve and/or the associated electrode are mounted in a floating manner and are oriented in relation to one another in this floating bearing state. When the retaining device of the hollow valve is oriented in relation to the associated electrode, the floating bearing is cancelled and thereby the retaining device together with the hollow valve is fixed in relation to the associated electrode. This makes it possible in the design of the cathode diameter to select a larger and more advantageous cathode diameter, because no or a distinctly lesser eccentricity of the bore must be provided. Through a greater cathode diameter, a more rapid processing and therefore shorter process times can be realized.

In a further advantageous embodiment of the solution according to the invention, in method step c.) and d.) at least two hollow valves are provided simultaneously. Furthermore, of course several electrodes can be provided, so that a simultaneous processing of several hollow valves and therefore an efficient manufacture are possible. In addition to the efficient manufacture, therefore, several valves can be manufactured simultaneously with the highest quality.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
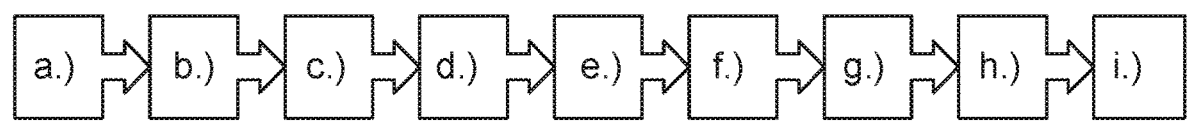
FIG. 1 a method according to the invention for producing at least one hollow valve with individual method steps, FIG. 2 a device for carrying out the method, FIG. 3 a sectional illustration through a finished produced hollow valve.

According to FIG. 1, a method according to the invention for producing at least one hollow valve 1 (cf. FIGS. 2 and 3) for gas exchange, in particular in internal combustion engines, has a total of nine method steps a.) to i.). In method step a.) firstly a bore 4 is introduced into a valve shaft 2 and into a valve head 3, or a hollow valve which has already been pre-bored in this manner is provided. In method step b.) a depth t of the bore 4 is then measured and the at least one hollow valve 1 is washed at least once. The washing can take place here before or after the measuring of the depth t of the bore 4. The depth t of the bore 4 can be measured here for example in a tactile manner, i.e. therefore with a measuring rod or with a test mandrel, or else also in a non-contact manner for example by means of ultrasound or laser. In the subsequent method step c.) the at least one hollow valve 1 is provided in a retaining device 5 (cf. FIG. 2) and in the method step d.) is oriented together with the retaining device 5 with respect to an associated electrode 6. In the method step e.) the electrode 6 is moved in relation to the hollow valve 1 and is inserted into bore 4 of the hollow valve. Subsequently, in method step f.) the bore 4 is processed by means of ECM processes and is enlarged in particular in the region of the valve head 3. A cavity 7 is produced here, in which a coolant 8, for example sodium, can subsequently be received. When the cavity 7 has reached the pre-defined size, the associated electrode 6 is removed from the hollow valve 1 in method step g.) and subsequently, in method step h.) the at least one hollow valve 1 is rinsed or respectively preserved. Finally, in method step i.) a further measurement of the remaining wall thickness w of a valve bottom 9 then takes place. The measuring of the remaining wall thickness w of the valve bottom 9 can take place here likewise in a tactile manner and/or by means of ultrasound or laser.

Figure 2:
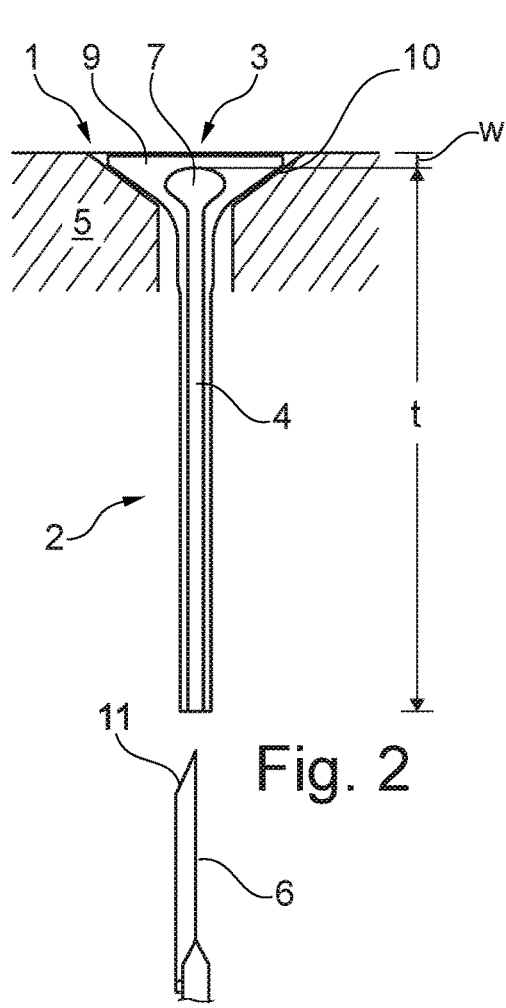
Figure 3:
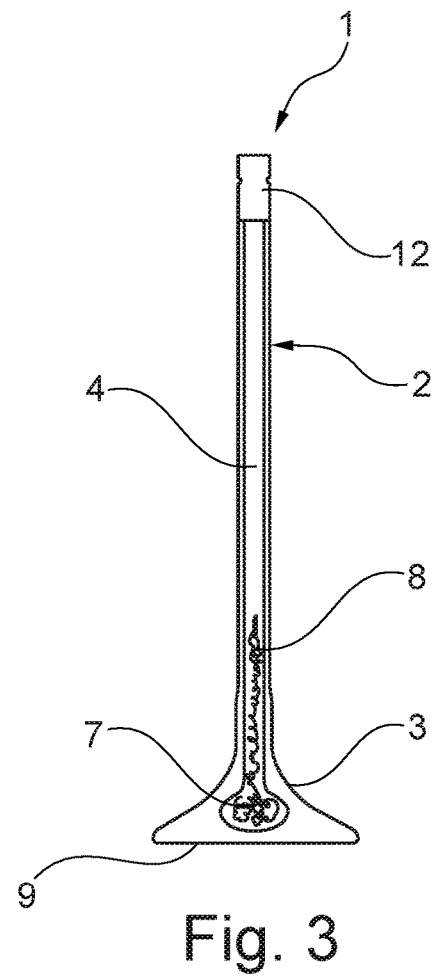

Observing FIG. 2, it can be seen that the hollow valves 1 are held in the retaining device 5 head first and in a centred manner in a mount 10 constructed in a complementary manner thereto. In this retaining device 5 of course a plurality of such hollow valves 1 can be received simultaneously and held, and can be supplied therewith collectively and in particular continuously to an associated electrode 6. The orienting of the retaining device 5 together with the hollow valve 1 in relation to the associated electrode 6 can also take place by means of a gripper, which is not shown, which orientates the bore 4 of the hollow valve 1 in relation to an insertion chamfer 11 of the electrode 6.

Of course, it is also conceivable that the retaining device 5 together with the hollow valve 1 and/or the associated electrode 6 are mounted in a floating manner and in this state, mounted in floating manner, the retaining device 5 together with the hollow valve 1 is oriented in relation to the associated electrode 6. When the orientation has taken place, the floating bearing of the retaining device 5 together with the hollow valve 1 and/or the associated electrode 6, is fixed, i.e. is cancelled.

After the method step h.) the at least one hollow valve 1 can be dried, for example, and after the method step i.) can be filled with coolant 8 and closed. The closing of the bore 4 can take place here for example by the placing on of a shaft end 12 and the fixing thereof on the valve shaft 2.

By the method according to the invention, hollow valves 1 can be produced extremely precisely and, in addition, efficiently and therefore economically.

The invention claimed is:

1. A method comprising:
   introducing a bore into a valve shaft and into a valve head to form at least one hollow valve;
   measuring a depth of the bore;
   washing the at least one hollow valve at least once;
   providing the at least one hollow valve in a retaining device;
   orienting the retaining device together with the at least one hollow valve with respect to an associated electrode via a gripper that orientates the bore of the at least one hollow valve in relation to an insertion chamfer of the electrode to enable a concentric orientation of a distal end of the insertion chamfer in relation to the bore, the insertion chamfer forming an acute angle with respect to a wall of the electrode;
   moving the associated electrode in relation to the at least one hollow valve;
   inserting the associated electrode into the bore of the at least one hollow valve;
   enlarging the bore in a region of the valve head by electrochemical machining processes;
   removing the associated electrode from the at least one hollow valve;
   at least one of rinsing and preserving the at least one hollow valve; and
   measuring a wall thickness of a valve bottom.

2. The method according to claim 1, wherein measuring the depth of the bore is performed at least one of in a tactile manner and by one of an ultrasound and a laser.

3. The method according to claim 1, wherein measuring the wall thickness of the valve bottom is performed at least one of in a tactile manner and by one of an ultrasound and a laser.

4. The method according to claim 1, wherein the retaining device together with the at least one hollow valve is provided continuously.

5. The method according to claim 1, wherein the at least one hollow valve is held head first and in a centred manner in a mount of the retaining device constructed in a complementary manner thereto.

6. The method according to claim 1, further comprising:
mounting at least one of the retaining device together with the at least one hollow valve and the associated electrode in a floating manner; and
fixing the at least one of the floating bearing of the retaining device together with the at least one of hollow valve and the associated electrode.

7. The method according to claim 1, further comprising:
drying the at least one hollow valve after at least one of rinsing and preserving the at least one hollow valve;
and filling the bore of the at least one hollow valve with coolant after measuring the wall thickness; and
closing the bore.

8. The method according to claim 7, wherein closing the bore includes placing a shaft end on the at least one hollow valve.

9. The method according to claim 1, wherein providing the at least one hollow valve includes simultaneously providing at least two hollow valves.

10. The method according to claim 2, wherein measuring at least one of the bore depth and the wall thickness of the valve bottom is performed in a tactile manner.

11. The method according to claim 2, wherein the retaining device together with the at least one hollow valve is provided continuously.

12. The method according to claim 3, wherein the retaining device together with the at least one hollow valve is provided continuously.

13. The method according to claim 2, wherein the at least one hollow valve is held head first and in a centred manner in a mount of the retaining device constructed in a complementary manner thereto.

14. The method according to claim 2, further comprising:
mounting at least one of the retaining device together with the at least one hollow valve and the associated electrode in a floating manner; and
fixing the at least one of the floating bearing of the retaining device together with the at least one of hollow valve and the associated electrode.

15. The method according to claim 2, further comprising:
drying the at least one hollow valve after at least one of rinsing and preserving the at least one hollow valve;
filling the bore of the at least one hollow valve with coolant after measuring the wall thickness; and
closing the bore.

16. The method according to claim 15, wherein closing the bore includes placing a shaft end on the at least one hollow valve.

17. A method comprising:
introducing a bore into a valve shaft and into a valve head to form at least one hollow valve;
measuring a depth of the bore;
washing the at least one hollow valve at least once;
providing the at least one hollow valve in a retaining device;
orienting the retaining device together with the at least one hollow valve with respect to an associated electrode via a gripper that orientates the bore of the at least one hollow valve in relation to an insertion chamfer of the electrode to enable a concentric orientation of a distal end of the insertion chamfer in relation to the bore, the insertion chamfer forming an acute angle with respect to a wall of the electrode;
moving the associated electrode in relation to the at least one hollow valve;
inserting the associated electrode into the bore of the at least one hollow valve;
enlarging the bore in a region of the valve head by electrochemical machining processes;
removing the associated electrode from the at least one hollow valve;
at least one of rinsing and preserving the at least one hollow valve;
drying the at least one hollow valve after at least one of rinsing and preserving the at least one hollow valve;
measuring a wall thickness of a valve bottom;
filling the bore of the at least one hollow valve with coolant; and
placing a shaft end on the at least one hollow valve to close the bore.

18. The method according to claim 17, wherein the coolant is sodium.

* * * * *